(12) United States Patent
Meyers et al.

(10) Patent No.: US 8,536,296 B2
(45) Date of Patent: Sep. 17, 2013

(54) EMULSIONS OF HIGH VISCOSITY SILICONE POLYETHERS

(75) Inventors: Deborah Lynn Meyers, Midland, MI (US); Jeffrey Rastello, Saginaw, MI (US); Simon Toth, Midland, MI (US); Bethany K. Johnson, Midland, MI (US); Isabelle Van Reeth, Shanghai (CN)

(73) Assignee: Dow Corning Corporation, Midland, MI (US)

( * ) Notice: Subject to any disclaimer, the term of this patent is extended or adjusted under 35 U.S.C. 154(b) by 242 days.

(21) Appl. No.: 13/141,353

(22) PCT Filed: Dec. 21, 2009

(86) PCT No.: PCT/US2009/068907
§ 371 (c)(1),
(2), (4) Date: Jun. 22, 2011

(87) PCT Pub. No.: WO2010/075244
PCT Pub. Date: Jul. 1, 2010

(65) Prior Publication Data
US 2011/0257319 A1 Oct. 20, 2011

Related U.S. Application Data

(60) Provisional application No. 61/140,278, filed on Dec. 23, 2008.

(51) Int. Cl.
*C08G 77/20* (2006.01)

(52) U.S. Cl.
USPC .............................................. 528/32; 525/474

(58) Field of Classification Search
USPC .......................................... 528/32; 525/474
See application file for complete search history.

(56) References Cited

U.S. PATENT DOCUMENTS

| | | | |
|---|---|---|---|
| 3,419,593 A | 12/1968 | Willing | |
| 3,715,334 A | 2/1973 | Karstedt | |
| 3,814,730 A | 6/1974 | Karstedt | |
| 3,923,705 A | 12/1975 | Smith | |
| 5,138,009 A | 8/1992 | Inoue | |
| 5,175,325 A | 12/1992 | Brown et al. | |
| 5,236,986 A | 8/1993 | Sakuta | |
| 6,187,891 B1 | 2/2001 | Rautschek et al. | |
| 6,878,773 B2 | 4/2005 | Marteaux et al. | |
| 2001/0041771 A1* | 11/2001 | Kondo et al. | 525/100 |

FOREIGN PATENT DOCUMENTS

| | | |
|---|---|---|
| EP | 0501791 | 11/1996 |
| EP | 1148099 | 10/2001 |
| EP | 0848029 | 4/2002 |
| WO | 2005102006 | 11/2005 |

* cited by examiner

Primary Examiner — Kuo-Liang Peng
(74) Attorney, Agent, or Firm — Alan Zombeck

(57) ABSTRACT

A process is disclosed for making an aqueous emulsion of a silicone polyether having a viscosity greater than 10 kPa-s at 25 QC by combining; an SiH terminated silicone polyether copolymer having an HLB of less than 7, an organopolysiloxane having terminal unsaturated groups, a hydrosilylation catalyst, and an emulsifier to form an oil phase, and then admixing water to the oil phase to form an emulsion.

6 Claims, No Drawings

EMULSIONS OF HIGH VISCOSITY SILICONE POLYETHERS

CROSS REFERENCE TO RELATED APPLICATIONS

This application is a U.S. national stage filing under 35 U.S.C. §371 of PCT Application No. PCT/US09/68907 filed on 21 Dec. 2009, currently pending, which claims the benefit of U.S. Provisional Patent Application No. 61/140,278 filed 23 Dec. 2008 under 35 U.S.C. §119 (e). PCT Application No. PCT/US09/68907 and U.S. Provisional Patent Application No. 61/140,278 are hereby incorporated by reference.

TECHNICAL FIELD

This disclosure relates to a process for making an aqueous emulsion of a silicone polyether having a viscosity greater than 10 kPa·s at 25° C. by combining; an SiH terminated silicone polyether copolymer having an HLB of less than 7, an organopolysiloxane having terminal unsaturated groups, a hydrosilylation catalyst, and an emulsifier to form an oil phase, and then admixing water to the oil phase to form an emulsion.

BACKGROUND

There have been numerous attempts to provide emulsions of high molecular weight silicones as an alternative to handling such materials in bulk. For example, U.S. Pat. No. 6,878,773 describes a silicon polymer emulsion that is made by having an organosiloxane polymer having SiH terminal groups, and an organic polymer having alkenyl terminal groups are first emulsified and then catalyzed to form a copolymer. The organic polymer can be polyisobutylene or alpha-omega diene. The polymer viscosity is claimed to be 10 to 1,000,000 Pa·s.

EP 1 148 099 A3 describes a copolymer emulsion prepared by the reaction of an SiH functional siloxane, a di-alkenyl functional polyoxyethylene, and an optional dialkenyl functional siloxane inside the emulsion particle.

However, a need still exists to prepare emulsions of high molecular weight silicone polyethers. The present inventors have identified a process to prepare such emulsions.

SUMMARY

This disclosure relates to a process for making an aqueous emulsion of a silicone polyether having a viscosity greater than 10 kPa·s at 25° C. comprising:
I) combining to form an oil phase;
A) an SiH terminated silicone polyether copolymer having an HLB of less than 7 and an average formula

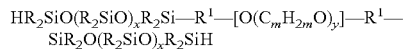

wherein x is $\geq 0$, m is from 2 to 4 inclusive, $y \geq 4$,
R is a monovalent hydrocarbon group containing 1 to 20 carbons,
$R^1$ is a divalent hydrocarbon containing 2 to 20 carbons,
B) an organopolysiloxane having terminal unsaturated groups,
C) a hydrosilylation catalyst,
D) an emulsifier,
II) admixing water to the oil phase to form an emulsion.
This disclosure further relates to the emulsion compositions prepared by the present processes.

DETAILED DESCRIPTION

The present disclosure provides a process for making an aqueous emulsion of a silicone polyether having a viscosity greater than 10 kPa·s at 25° C. The first step in the process involves preparing an oil phase by combining;
A) an SiH terminated silicone polyether copolymer having an HLB of less than 7 and an average formula

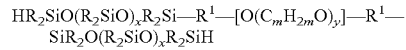

wherein x is $\geq 0$, m is from 2 to 4 inclusive, $y \geq 4$,
R is independently a monovalent hydrocarbon group containing 1 to 20 carbons,
$R^1$ is a divalent hydrocarbon containing 2 to 20 carbons,
B) an organopolysiloxane having terminal unsaturated groups,
C) a hydrosilylation catalyst, and
D) an emulsifier.
Each are described in more detail as follows.
A) The SiH Terminated Silicone Polyether Copolymer
Component A in the present disclosure is an SiH terminated silicone polyether copolymer having an HLB of less than 7 and an average formula

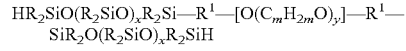

wherein x is $\geq 0$, m is from 2 to 4 inclusive, $y \geq 4$,
R is a monovalent hydrocarbon group containing 1 to 20 carbons,
$R^1$ is a divalent hydrocarbon containing 2 to 20 carbons
The silicone polyether copolymers useful as component A may be block copolymers of the general formula B'-A-B', where B' represents the SiH terminated silicone block, and A the polyether block.

The silicone polyether copolymers of the present disclosure comprises a polyether group. As used herein, "polyether" designates a polyoxyalkylene group. The polyoxyalkylene group may be represented by the formula $(C_mH_{2m}O)_y$, wherein m is from 2 to 4 inclusive, and y is greater than 4, alternatively y may range from 5 to 80, or alternatively from 5 to 60. The polyoxyalkylene group may comprise oxyethylene units ($C_2H_4O$), oxypropylene units ($C_3H_6O$), oxybutylene units ($C_4H_8O$), or mixtures thereof. Typically, the polyoxyalkylene group comprises oxyethylene units ($C_2H_4O$) or mixtures of oxyethylene units and oxypropylene units. When mixtures of oxyethylene units and oxypropylene units (which may be represented as EO and PO groups respectively) are present in the copolymer, typically they are in the form of a random copolymer. That is, the EO and PO groups in the polyether chain do not form as a block of each unit, but rather are randomized within the polyether block.

The "silicone" group in the silicone polyether copolymers of the present disclosure is a diorganopolysiloxane. The diorganopolysiloxane may be a predominately linear siloxane polymer having the formula $(R_2SiO)_x$, wherein R is a monovalent hydrocarbon group containing 1 to 20 carbons as defined above, x is $\geq 0$, alternatively x may range from 2 to 100, or from 10 to 60. The hydrocarbon groups represented by R in the siloxane polymer are free of aliphatic unsaturation. These organic groups may be independently selected from monovalent hydrocarbon and monovalent halogenated hydrocarbon groups free of aliphatic unsaturation. These monovalent hydrocarbon groups may have from 1 to 30 carbon atoms, alternatively 1 to 10 carbon atoms, and are exemplified by, but not limited to alkyl groups such as methyl, ethyl, propyl, butyl, pentyl, hexyl, heptyl, octyl, undecyl, and octadecyl;

cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Typically, the diorganopolysiloxane is a predominately linear polydimethylsiloxane having the formula $(Me_2SiO)_x$, where x is as defined above and Me is methyl.

At least one end of each polyether block is linked to an organopolysiloxane block by a divalent hydrocarbon group, designated $R^1$. This linkage is determined by the reaction employed to prepare the silicone polyether copolymer. The divalent hydrocarbon group $R^1$ may be independently selected from divalent hydrocarbon groups containing 2 to 30 carbons. Representative, non-limiting examples of such divalent hydrocarbon groups include; ethylene, propylene, butylene, isobutylene, pentylene, hexylene, heptylene, octylene, and the like. Representative, non-limiting examples of such divalent organofunctional hydrocarbons groups include acrylate and methacrylate. Typically, $R^1$ is isobutylene ($-CH_2CH(CH_3)CH_2-$) or propylene ($-CH_2CH_2CH_2-$).

The overall HLB value for the silicone copolymer should have a value that is less than 7, alternatively less than 4, or alternatively less than 2, but in all cases greater than 0.1. HLB is commonly used to describe the emulsifying capabilities of organic (nonionic) surfactants based on ethylene oxide. However, as used herein for SiH terminated silicone polyether copolymers, HLB is calculated by dividing the weight percent content of the EO units present in the silicone polyether by 5. Thus, the number of EO groups (as indicated by y' when the polyoxyalkylene group is polyoxyethylene) and the DP of the polysiloxane (as indicated by x) may vary as follows;
x is from 2 to 400 and y' is from 4 to 100,
  alternatively x is from 8 to 200 and y' from 4 to 50,
  or alternatively x is from 10 to 100 and y' from 4 to 25.

Representative, non-limiting, average formulas of the SiH terminated silicone polyether copolymer of the present disclosure are shown below;

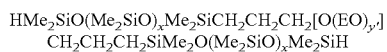
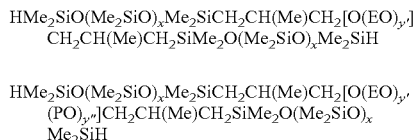

wherein x is as defined above,
y' is $\geq 4$, alternatively y' is 4 to 60,
y'' is $\geq 0$, alternatively y'' is 0 to 60,
  with the proviso that y'+y''$\geq 4$
Me is methyl,
EO is $-CH_2CH_2O-$, and
PO is $-CH_2CH(Me)O-$ or $-CH_2CH_2CH_2O-$.

The SiH terminated silicone polyether copolymer useful as component A in the present disclosure may be prepared by any method known in the art. Typically, they are prepared by reacting an SiH terminated organopolysiloxane with a polyoxyalkylene compound having a terminal unsaturated group at each molecular chain end (i.e. alpha and omega positions) via a hydrosilylation reaction.

The SiH terminated organopolysiloxanes useful to prepare the SiH terminated silicone polyether copolymers of the present disclosure may be represented by the formula M'DM', where "M'" means a siloxane unit of formula $R_2HSiO_{1/2}$, "D" means a siloxane unit of formula $R_2SiO_{2/2}$, where R is independently a monovalent hydrocarbon group as defined above. Typically, the SiH terminated organopolysiloxane is a dimethylhydrogensiloxy-terminated polydimethylsiloxane having the average formula $Me_2HSiO(Me_2SiO)_xSiHMe_2$, where x is $\geq 0$, alternatively x may range from 2 to 100, or from 2 to 50. SiH terminated organopolysiloxanes and methods for their preparation are well known in the art.

The polyoxyalkylene compound useful to prepare the SiH terminated silicone polyether copolymers of the present disclosure can be any polyoxyalkylene group that is terminated at each molecular chain end (i.e. alpha and omega positions) with a unsaturated organic group. The polyoxyalkylene may result from the polymerization of ethylene oxide, propylene oxide, butylene oxide, 1,2-epoxyhexane, 1,2-epoxyoctane, cyclic epoxides such as cyclohexene oxide or exo-2,3-epoxynorborane. Alternatively, the polyoxyalkylene may be represented by the formula $(C_mH_{2m}O)_y$, wherein m is from 2 to 4 inclusive, and y is greater than 4, alternatively y may range from 5 to 60, or alternatively from 5 to 30. The polyoxyalkylene group may comprise oxyethylene units ($C_2H_4O$), oxypropylene units ($C_3H_6O$), oxybutylene units ($C_4H_8O$), or mixtures thereof. Typically, the polyoxyalkylene group comprises oxyethylene units ($C_2H_4O$) or mixtures of oxyethylene units and oxypropylene units. The unsaturated organic group can be an unsaturated aliphatic hydrocarbon group such as alkenyl or alkynyl group. Representative, non-limiting examples of the alkenyl groups are shown by the following structures; $H_2C=CH-$, $H_2C=CHCH_2-$, $H_2C=C(CH_3)CH_2-$, $H_2C=CHCH_2CH_2-$, $H_2C=CHCH_2CH_2CH_2-$, and $H_2C=CHCH_2CH_2CH_2CH_2-$ Representative, non-limiting examples of alkynyl groups are shown by the following structures; $HC\equiv C-$, $HC\equiv CCH_2-$, $HC\equiv CC(CH_3)-$, $HC\equiv CC(CH_3)_2-$, and $HC\equiv CC(CH_3)_2CH_2-$. Alternatively, the unsaturated organic group can be an organofunctional hydrocarbon such as an acrylate, methacrylate and the like.

The polyoxyalkylene may be selected from those having the average formula

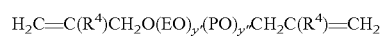

wherein y' is $\geq 1$, alternatively y' is 0 to 60,
y'' is $\geq 0$, alternatively y'' is 0 to 60,
  with the proviso that y'+y''$\geq 4$
$R^4$ is hydrogen or an alkyl group containing 1 to 20 carbon atoms,
EO is $-CH_2CH_2O-$,
PO is $-CH_2CH(Me)O-$ or $-CH_2CH_2CH_2O-$.

Polyoxyalkylenes having an unsaturated aliphatic hydrocarbon group at each molecular terminal are known in the art, and many are commercially available. Representative, non-limiting examples of polyoxyalkylenes include;

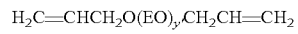

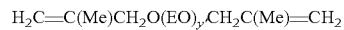

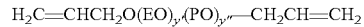

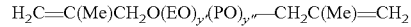

wherein
y' is $\geq 1$, alternatively y' is 4 to 60,
y'' is $\geq 0$, alternatively y'' is 0 to 60,
Me is methyl,
EO is $-CH_2CH_2O-$, and PO is $-CH_2CH(Me)O-$ or $-CH_2CH_2CH_2O-$.

Polyoxyalkylenes having an unsaturated aliphatic hydrocarbon group at each molecular terminal are commercially available from NOF (Nippon Oil and Fat, Tokyo, Japan) and Clariant Corp. (Charlottesville, N.C.). Representative non-limiting examples include; Uniox DMUS-5 having the formula $$CH_2\!\!=\!\!C(CH_3)CH_2O(EO)_{13}CH_2C(CH_3)\!\!=\!\!CH_2 \text{ and}$$

Polycerin 50DMUS-60, $CH_2\!\!=\!\!C(CH_3)CH_2O(EO)_{10}(PO)_{7.6}CH_2C(CH_3)\!\!=\!\!CH_2$, both available from NOF America Corporation (White Plains, N.Y.).

The SiH terminated organopolysiloxane and polyoxyethylene having an unsaturated organic group at each molecular terminal are reacted in the presence of a hydrosilylation catalyst. The hydrosilylation catalyst may be selected from any known in the art and are further described below as component C) which is also added to the oil phase in step I of the present process. The hydrosilylation catalyst can be used in an amount of from 0.00001-0.5 parts per 100 weight parts of the ≡SiH containing polysiloxane. Alternatively, the catalyst should be used in an amount sufficient to provide 0.1-15 parts per million (ppm) Pt metal per total composition used to prepare the silicone polyether copolymer.

The hydrosilylation reaction to prepare the SiH terminated silicone polyether copolymers of the present disclosure can be conducted neat or in the presence of a solvent. The solvent can be an alcohol such as methanol, ethanol, isopropanol, butanol, or n-propanol, a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, a halogenated hydrocarbon such as dichloromethane, 1,1,1-trichloroethane or methylene chloride, chloroform, dimethyl sulfoxide, dimethyl formamide, acetonitrile, tetrahydrofuran, white spirits, mineral spirits, or naphtha.

The amount of solvent can be up to 70 weight percent, but is typically from 20 to 50 weight percent, said weight percent being based on the total weight of components in the hydrosilylation reaction. The solvent used during the hydrosilylation reaction can be subsequently removed from the resulting silicone polyether by various known methods.

Additional components can be added to the hydrosilylation reaction which are known to enhance such reactions. These components include salts such as sodium acetate which have a buffering effect in combination with platinum catalysts.

The amount of the SiH terminated organopolysiloxane and polyoxyethylene having an unsaturated organic group at each molecular terminal used in the hydrosilylation reaction may vary. However, typically the mole ratio of SiH to unsaturated groups (for example the SiH/vinyl ratio) should be approximately 2 to ensure the formation of the SiH terminated silicone polyether copolymer.

B) The Organopolysiloxane Having Terminal Unsaturated Groups

Component B is an organopolysiloxane having terminal unsaturated groups may be selected from a $R^2\!\!-\!\!Y^2\!\!-\!\!R^2$ compound where $Y^2$ is a siloxane. The $Y^2$ siloxane group may be selected from any organopolysiloxane bonded to at least two organic groups having aliphatic unsaturation, designated as $R^2$, to form $R^2\!\!-\!\!Y^2\!\!-\!\!R^2$ structures. Thus, component (B) can be any organopolysiloxane, and mixtures thereof, comprising at least two siloxane units represented by the average formula $$R^2R_mSiO_{(4-m)/2}$$

wherein

R is a hydrocarbon group as described above, $R^2$ is a monovalent unsaturated aliphatic group as defined above, and m is zero to 3

The $R^2$ group may be present on any mono, di, or tri siloxy unit in an organopolysiloxane molecule, for example; $(R^2R_2SiO_{0.5})$, $(R^2RSiO)$, or $(R^2SiO_{1.5})$; as well as in combination with other siloxy units not containing an $R^2$ substituent, such as $(R_3SiO_{0.5})$, $(R_2SiO)$, $(RSiO_{1.5})$, or $(SiO_2)$ siloxy units where R is a monovalent hydrocarbon group containing 1 to 20 carbons as defined above; providing there are at least two $R^2$ substituents in the organopolysiloxane.

Representative, non-limiting, examples of such siloxane based $R^2\!\!-\!\!Y^2\!\!-\!\!R^2$ structures suitable as component ($B^2$) include;

$$(R_2R^2SiO_{0.5})(SiO_2)_w(R_2R^2SiO_{0.5})$$

$$(R_2R^2SiO_{0.5})(SiO_2)_w(R_2SiO)_x(R_2R^2SiO_{0.5})$$

$$(R_2R^2SiO_{0.5})(R_2SiO)_x(R_2R^2SiO_{0.5})$$

$$(R_3SiO_{0.5})(R_2SiO)_x(R^2RSiO)_y(R_3SiO_{0.5})$$

$$(R_3SiO_{0.5})(R_2SiO)_x(R^2RSiO)_y(RSiO_{1.5})_z(R_3SiO_{0.5})$$

$$(R_3SiO_{0.5})(R_2SiO)_x(R^2RSiO)_y(SiO_2)_w(R_3SiO_{0.5})$$

where $w\geq 0$, $x\geq 0$, $y\geq 2$, and z is $\geq 0$, R is an organic group, and $R^2$ is a monovalent unsaturated aliphatic hydrocarbon group.

B may be selected from vinyl functional polydimethylsiloxanes (vinyl siloxanes) or hexenyl functional polydimethylsiloxanes (hexenyl siloxanes), such as those having the average formula;

$$CH_2\!\!=\!\!CH(Me)_2SiO[Me_2SiO]_xSi(Me)_2CH\!\!=\!\!CH_2$$

$$CH_2\!\!=\!\!CH\!\!-\!\!(CH_2)_4\!\!-\!\!(Me)_2SiO[Me_2SiO]_xSi(Me)_2\!\!-\!\!(CH_2)_4\!\!-\!\!CH\!\!=\!\!CH_2$$

$$Me_3SiO[(Me)_2SiO]_{x'}[CH_2\!\!=\!\!CH(Me)SiO]_{x''}SiMe_3$$

wherein

Me is methyl, $x'\geq 0$, alternatively x is 0 to 200, alternatively x is 10 to 150, $x''\geq 2$, alternatively x" is 2 to 50, alternatively x" is 2 to 10.

Vinyl functional polydimethylsiloxanes are known, and there are many commercially available. Representative, non-limiting examples include; SFD 128, DC4-2764, DC2-7891, DC2-7754, DC2-7891, and DC 2-7463, SFD-117, SFD-119, SFD 120, SFD 129, DC 5-8709, LV, 2-7038, DC 2-7892, 2-7287, 2-7463, and dihexenyl terminal DC7692, DC7697 (all commercially available from Dow Corning Corporation, Midland Mich.).

The amount of components A) and B) used in the oil phase may vary. For example the mole ratio of the unsaturated terminal groups of the organopolysiloxane B) to the SiH content of the silicone polyether A) may vary from 0.1 to 2. Typically the amount of B) used is such that the mole ratio of the unsaturated terminal groups of the organopolysiloxane B) to the SiH content of the silicone polyether A) is greater than 1, alternatively from 1 to 1.2.

C) The Hydrosilylation Catalyst

A hydrosilylation catalyst is included as component C) in step I of the present process. Hydrosilylations are well known in the art and involve the reaction between a polysiloxane containing ≡Si—H groups, and a material containing unsaturation, e.g., vinyl groups. The reaction uses a catalyst to effect the reaction between the ≡SiH containing polysiloxane and the material containing unsaturation. Suitable catalysts are Group VIII transition metals, i.e., the noble metals. Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

The noble metal catalyst can be used in an amount of from 0.00001-0.5 parts per 100 weight parts of the ≡SiH containing polysiloxane. Alternatively, the catalyst should be used in an amount sufficient to provide 0.1-15 parts per million (ppm) Pt metal per total composition.

D) The Emulsifier

Component D in the process of the present disclosure is an emulsifier. As used herein, "emulsifier" refers to any compound or substance that enables the formation of an emulsion. The emulsion may be an oil/water emulsion, a water/oil emulsion, a multiple phase or triple emulsion. The emulsifier may be selected from any surface active compound or polymer capable of stabilizing emulsions. Typically, such surface active compounds or polymers stabilize emulsions by preventing coalescence of the dispersed particles. The surface active compounds useful as emulsifiers in the present process may be a surfactant or combination of surfactants. The surfactant may be an anionic surfactant, cationic surfactant, nonionic surfactant, amphoteric surfactant, or a mixture of any of these surfactants.

Representative examples of suitable anionic surfactants include alkali metal soaps of higher fatty acids, alkylaryl sulfonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates.

Representative examples of suitable cationic surfactants include alkylamine salts, quaternary ammonium salts, sulfonium salts, and phosphonium salts. Representative examples of suitable nonionic surfactants include condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, and fatty amine oxides. Representative examples of suitable amphoteric surfactants include imidazoline compounds, alkylaminoacid salts, and betaines.

Representative examples of suitable commercially available nonionic surfactants include polyoxyethylene fatty alcohols sold under the tradename BRIJ by Uniqema (ICI Surfactants), Wilmington, Del. Some examples are BRIJ 35 Liquid, an ethoxylated alcohol known as polyoxyethylene (23) lauryl ether, and BRIJ 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL® 15-S-5, TERGITOL® 15-S-12, TERGITOL® 15-S-15, and TERGITOL® 15-S-40.

The total amount of emulsifiers used is 0.1-50, alternatively 1-10 weight percent of the oil phase present in the emulsion.

Components A, B, C, and D are combined, typically with mixing, to form an oil phase. The order of mixing may vary, but typically components A, B, and D are first combined, then the hydrosilylation catalyst C is added to affect reaction between components A and B.

Mixing in step (i) can be accomplished by any method known in the art to affect mixing of high viscosity materials. The mixing may occur either as a batch, semi-continuous, or continuous process. Mixing may occur, for example using, batch mixing equipments with medium/low shear include change-can mixers, double-planetary mixers, conical-screw mixers, ribbon blenders, double-arm or sigma-blade mixers; batch equipments with high-shear and high-speed dispersers include those made by Charles Ross & Sons (NY), Hockmeyer Equipment Corp. (NJ); batch equipments with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments.

Step ii) in the present process involves admixing water or an aqueous phase to the oil phase incrementally or at a steady rate until phase inversion occurs to form an emulsion. Mixing is affected with vigorous agitation or high shear and is allowed to continue until phase inversion occurs. Mixing may be provided by devices such as a rotor stator mixer, a homogenizer, a sonolator, a microfluidizer, a colloid mill, mixing vessels equipped with high speed spinning or with blades imparting high shear, or sonication. As used herein phase inversion means that the external continuous phase makes a sudden change from oil to aqueous.

The amount of water or aqueous phase added in step ii) to cause phase inversion can vary depending on the type of the oil phase and process condition, generally the amount of water or aqueous phase is from 5 to 200 parts per 100 parts by weight of the step I oil phase mixture, alternatively from 10 to 100 parts per 100 parts by weight of the oil phase.

When water is added to the oil phase mixture from step I in incremental portions, each incremental portion should be added successively to the mixture after the previous portion of water has been well dispersed into the mixture, such that the overall rate is not more than 10 parts of water per 100 parts of oil per minute while keeping a concurrent mixing.

The resulting emulsion from step II) can be further diluted with water.

Other additives can also be incorporated in the emulsion, such as fillers, foam control agents; anti-freeze agents and biocides.

The internal phase viscosity of emulsion of the present disclosure may be measured by first breaking the emulsion with IPA. The gum content may be measured with a rheometer using dynamic frequency sweep analysis. The viscosity that can range from 10,000 to 1,000,000 Pa·s at 0.01 Hz frequency. A typical procedure for testing the high viscosity internal phase is as follows:
Load 10 g emulsion in a plastic tube, add 30 g of IPA and close the tube, thoroughly shake the tube for about 30 second in a wrist action shaker. Then place the tube in a centrifuge to spin it for 15 minutes at 3000 rpm. After centrifuging decant the liquid and place the high viscosity polymer in an aluminum dish. Dry the polymer in hood for 24 hours. Place the dry polymer between the plates of the rheometer that has been calibrated and its plates have been zeroed. Using dynamic frequency sweep analysis, measure the dynamic viscosity between 0.0005 Hz to 80 Hz at 25° C. Take the reading at 0.01 Hz.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Example 1

Reference-Copolymer Preparation 21 g of DMUS5 $(CH_2=C(CH_3)CH_2O(EO)_{13}CH_2C(CH_3)=CH_2$ (available from NOF America Corporation, White Plains, N.Y.) was added over 1 hour period to 240 g 50 DP SiH-terminal polydimethylsiloxane at 90 C.° while stirring in 3 neck flask equipped with reflux and temperature control. 0.42 g of 2-0707 platinum catalyst complex is added to the mixture at the beginning of the addition and 0.14 g after 30 minutes the addition started. After all the DMUS5 was added the mixture was stirred for an additional hour. The final product was obtained as a slightly yellow colored clear liquid.

Example 2

Reference-Copolymer Preparation 45 g of 50DMUS60 $(CH_2=C(CH_3)CH_2O(EO)_{10}(PO)_{7.6}CH_2C(CH_3)=CH_2$ (available from NOF America Corporation, White Plains, N.Y.) was added over 1 hour period to 204 g 26.5 DP SiH-terminal polydimethylsiloxane at 90 C.°while stirring in 3 neck flask equipped with reflux and temperature control. 0.42 g of 2-0707 platinum catalyst complex is added to the mixture at the beginning of the addition and 0.14 g after 30 minutes the addition started. After all the 50DMUS60 was added the mixture was stirred for an additional hour. The final product was obtained as a slightly yellow colored clear liquid.

Example 3

Reference-Copolymer Preparation 25.5 g of DMUS-5 was added over 1 hour period to 240 g 45.8 DP SiH-terminal polydimethylsiloxane at 90 C.° while stirring in 3 neck flask equipped with reflux and temperature control. 0.42 g of 2-0707 platinum catalyst complex is added to the mixture at the beginning of the addition and 0.14 g after 30 minutes the addition started. After all the DMUS-5 was added the mixture was stirred for an additional hour. The final product was obtained as a slightly yellow colored clear liquid.

Examples 4-9

Preparation of Emulsions

The copolymers prepared in Examples 1-3 were then formulated into emulsions, which are labeled as Examples 4, 6, 8. Comparative examples 5, 7, and 9 were prepared by formulating similar emulsions, but without first creating copolymers.
Process to Prepare Emulsions
First the polymers were mixed together. Then, the surfactants were added to the mixture. In the next step the inversion water was added. The mixing created a gel-like composition (high solid containing emulsion). The catalyst was then added and mixed at room temperature. Alternatively the catalyst can be added at up to 70° C. The composition was diluted to the desired solid content.

The dynamic viscosities of the resulting emulsions, and their formulations, are summarized in Table 1 below.

TABLE 1

| Ingredients | Functional group Conc. % | Ex 4 emulsion with SiH copolymer | Comp Ex 5 emulsion with ingredients (polyether + Vi siloxane + SiH siloxane) | Ex 6 emulsion with SiH copolymer | Comp Ex 7 emulsion with ingredients (polyether + Vi-siloxane + SiH siloxane) | Ex 8 emulsion with SiH copolymer | Comp Ex 9 emulsion with ingredients (polyether + Vi-siloxane + SiH siloxane) |
|---|---|---|---|---|---|---|---|
| SFD-128* | 0.086 | 26.9 | 26.9 | 26.9 | 26.9 | 25.4 | 25.4 |
| Example 2 copolymer | 0.035 | 2.44 | | | | | |
| 50DMUS60 | 5.265 | | 0.44 | | | | |
| SiH terminal siloxane DP = 26.5 | 0.0868 | | 2 | | | | |
| Example 1 copolymer | 0.018 | | | | | 4.42 | |
| DMUS-5 | 7.479 | | | | | | 0.36 |
| SiH terminal siloxane DP = 50 | 0.0473 | | | | | | 4.06 |
| Example 3 copolymer | 0.0248 | | | 3.5 | | | |
| DMUS-5 | 7.479 | | | | 0.35 | | |
| SiH terminal siloxane DP = 45.8 | 0.059 | | | | 3.15 | | |
| Renex 30 | | 0.94 | 0.94 | 0.94 | 0.94 | | |
| Brij 30 | | | | | | 0.89 | 0.89 |
| Brij 35 | | 1.75 | 1.75 | 1.75 | 1.75 | 1.65 | 1.65 |
| Water (Inversion) | | 1.21 | 1.21 | 1.21 | 1.21 | 1.14 | 1.14 |
| DC2-0707 | | 0.08 | 0.08 | 0.08 | 0.08 | 0.18 | 0.18 |
| Water (Dilution) | | 6.7 | 6.7 | 6.7 | 6.7 | 9.3 | 9.3 |
| Dynamic Viscosity at 0.01 Hz, Pa · s | | 164,000 | 15,200 | 51,000 | 24,400 | 35,800 | 2,400 |
| SiH/Vi Ratio | | 1 | 1 | 1 | 1 | 1 | 1 |

*SFD-128 = a Dimethylvinylsiloxy-terminated polydimethylsiloxane having an viscosity of 40,000 mm²/s at 25° C.

Example 10

Comparative Example

A neat polymer mixture of 26.9 g of SFD-128, 2.44 g of SPE from Example 2, and 0.08 g of 2-0707 was prepared. Then the polymer mixture was cured into a high viscosity gum copolymer. Attempts to emulsify this copolymer were unsuccessful.

The invention claimed is:

1. A process for making an aqueous emulsion of a silicone polyether having a viscosity greater than 10 kPa·s at 25° C. comprising:

I) combining to form an oil phase;
  A) an SiH terminated silicone polyether copolymer having an HLB of less than 7 and an average formula

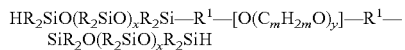
  $HR_2SiO(R_2SiO)_xR_2Si-R^1-[O(C_mH_{2m}O)_y]-R^1-SiR_2O(R_2SiO)_xR_2SiH$ wherein x is $\geq 0$, m is from 2 to 4 inclusive, $y \geq 4$,
   R is a monovalent hydrocarbon group containing 1 to 20 carbons,
   $R^1$ is a divalent hydrocarbon containing 2 to 20 carbons,
  B) an organopolysiloxane having terminal unsaturated groups,
  C) a hydrosilylation catalyst,
  D) an emulsifier,
II) admixing water to the oil phase to form an emulsion.

2. The process of claim 1 wherein the silicone polyether has the average structure

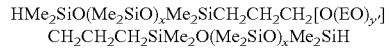
$HMe_2SiO(Me_2SiO)_xMe_2SiCH_2CH_2CH_2[O(EO)_{y'}]$
$CH_2CH_2CH_2SiMe_2O(Me_2SiO)_xMe_2SiH$ where x is greater than 10, EO is —$CH_2CH_2O$—, and y' is greater than 4.

3. The process of claim 1 wherein the mole ratio of the terminal unsaturated groups of the organopolysiloxane B) to the SiH content of the silicone polyether A) is greater than 1.

4. The process of claim 1 wherein B) the organopolysiloxane having terminal unsaturated groups has the average formula

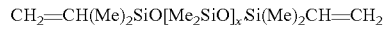
$CH_2=CH(Me)_2SiO[Me_2SiO]_{x'}Si(Me)_2CH=CH_2$ wherein x' is greater than zero.

5. The process of claim 1 wherein the emulsifier is a mixture of non-ionic surfactants.

6. The process of claim 5 wherein the non-ionic surfactants are polyoxyethylene (23) lauryl ether and polyoxyethylene (4) lauryl ether.

* * * * *